United States Patent [19]

Merrill et al.

[11] Patent Number: 5,150,515
[45] Date of Patent: Sep. 29, 1992

[54] KINETIC WHEEL ALIGNMENT SYSTEM AND METHOD

[75] Inventors: M. Stanley Merrill, Denver; Thomas B. Chapin, Lakewood, both of Colo.

[73] Assignee: Merilab, Inc., Englewood, Colo.

[21] Appl. No.: 667,980

[22] Filed: Mar. 12, 1991

[51] Int. Cl.$^5$ .................. G01B 7/315; G01B 5/255
[52] U.S. Cl. .................. 33/203.12; 33/203.13
[58] Field of Search .......... 33/203.13, 203.12, 203.14, 33/203.15, 203.16, 203.17, 203.21

[56] References Cited

U.S. PATENT DOCUMENTS

| | | | |
|---|---|---|---|
| 3,187,440 | 6/1965 | Merrill et al. | 33/203.13 |
| 3,453,740 | 7/1969 | Sakamoto | 33/203.13 |
| 3,546,782 | 12/1970 | Pereue et al. | 33/203.13 |
| 3,908,280 | 7/1975 | Murakami et al. | 33/203.13 |
| 4,380,875 | 4/1983 | Erickson et al. | 33/203.13 |
| 4,443,951 | 4/1984 | Elsässer et al. | 33/203.13 |
| 4,567,667 | 2/1986 | Minagawa et al. | 33/203.14 |
| 4,631,832 | 12/1986 | Schrammen et al. | 33/203.12 |
| 4,679,327 | 7/1987 | Fouchey et al. | 33/203.13 |
| 4,885,846 | 12/1989 | Németh et al. | 33/203.13 |
| 4,901,560 | 2/1990 | Hirano et al. | 33/203.13 |
| 4,962,664 | 10/1990 | Hirano et al. | 33/203.13 |

*Primary Examiner*—William A. Cuchlinski, Jr.
*Assistant Examiner*—Alvin Wirthlin
*Attorney, Agent, or Firm*—Beaton & Swanson

[57] ABSTRACT

An improved wheel alignment system and method is disclosed. This invention is a kinetic alignment system combining a geometric wheel aligner which measures toe angle with reference to the sidewall of a tire, and a dynamic wheel aligner which measures toe and camber angles with reference to the tread of the tire in order to rapidly and simultaneously measure both the position of a vehicle's wheel and the roll of the tire associated with the wheel. The geometric aligner of this invention includes (a) an improved pivot assembly that reduces scrub and the corresponding false position readings that otherwise result from the scuffing of the geometric apparatus across the sidewall of the tire when the wheel's plane of rotation changes, and (b) an improved striker assembly so as better to strike the sidewall of a tire at the tire's center line and, where the exact center line is missed, to self-correct for the unbalanced tire forces resulting from the missed strike. The method of this invention is a way of using the new kinetic alignment system to perform a real time, production line audit of wheel position, vehicle tracking, and lateral tire forces which might alter the driveability of the vehicle.

8 Claims, 4 Drawing Sheets

KINETIC WHEEL ALIGNMENT SYSTEM AND METHOD

BACKGROUND OF THE INVENTION

Correct vehicle suspension and geometry improve the directional stability, tracking, cornering, and the overall "driveability" and handling of a vehicle while also increasing tire tread life and wear. Wheel alignment is an important aspect of overall vehicle suspension and geometry. Wheel misalignment has typically been one of the leading defects of newly assembled vehicles and has been, as a result, one of the biggest after-sale warranty make up items. Vehicle manufacturers continue to seek an assembly line solution for auditing and adjusting vehicle wheel alignment before the vehicle is delivered to a customer. Toe angle and camber angle are measurements of two of the forces relating to proper vehicle wheel alignment.

Toe may be defined as the slanting of the wheels towards the front or back. A slanting of the wheels towards the front so that they are closer together at the front than the back is referred to as "toe in" and is indicated by a positive toe angle between (a) a line drawn in the plane of rotation of the wheel through the center of the wheel and parallel to the ground, and (b) a reference line drawn from the front to back of the vehicle and parallel to the ground. Where the wheels are farther apart at the front than at the back, the condition is "toe out" and is indicated by a negative toe angle.

Camber may be defined as the sloping of the wheels from top to bottom. A sloping of the wheels inwards towards the bottom so that they are closer together at the bottom than at the top results in an outward tilt of the tires at the top. This is indicated by a positive camber angle between (a) a vertical line drawn in the plane of rotation of the wheel through the center of wheel, and (b) a reference line drawn perpendicular to the ground. Where the wheels are farther apart at the bottom than at the top, the condition is indicated by a negative camber angle.

Correct vehicle wheel alignment results in a better handling vehicle with reduced tire wear. It does so by helping to ensure, by toe and camber adjustment, that the wheels are within the automobile manufacturer's specifications for geometrical position and that the roll of the tire is within the driver's expectations for driveability. There are two distinct, and commercially competing, kinds of devices currently being used by vehicle manufacturers and others to measure and adjust toe and camber. The two kinds of devices may be referred to as geometric aligners and dynamic aligners.

A geometric aligner measures toe or camber, using angles derived from measurements taken from the sidewalls of the tires. A typical geometric aligner uses a system of rollers which contact the sidewalls of the tires. Two rollers may be placed at either end of a rocker bar with the rocker bar pivotally pinned to a support rod so as to form a "T". The rollers are located at the ends of the horizontal bar across the top of the T, and the pivot point is located at the intersection of the horizontal and vertical member of the T. When the rocker arm is oriented horizontally with each roller in contact with the sidewall of the tire at opposite points on the circumference, an angle formed at the pivot point can measure toe in or toe out. As the rollers come in contact with the sidewall of the rotating tire, they adjust to reflect the position of the tire. The position of the rocker arm angle is then measured to give the toe angle of the wheel.

To determine the camber of the wheel with a geometric aligner, a third roller is generally placed perpendicularly to the other two. From the position of this third roller relative to the other two, the camber angle may be derived. Because of wheel run out, tire carcass deviations, and raised lettering, the tire's sidewall surface is not uniform. As a result, most geometric alignment systems will require several revolutions of the tire to obtain a continuous average of sampled data points from which to derive the toe and camber angles.

A dynamic aligner, in contrast, derives toe and camber angles, not from the rotating sidewall of the tire, but from the tread of the rotating tire using a servomechanism to turn and tip a displacement box beneath the tire. A dynamic aligner is designed to have a pair of rollers underneath the tires of a vehicle. The rollers are typically mounted in a displacement box which, by means of a servomechanism, can be made to pivot about a toe axis and also made to pivot about a camber axis. As the tire rotates over the surface of the pair of rollers, the roller pair will be displaced. When both rollers are displaced in the same direction along their axes, a toe adjustment is indicated, and the servomechanism will cause the displacement box to turn in toe until the rollers' axes are parallel to the tire's axis of rotation and perpendicular to the toe plane, creating an angle that measures toe in or toe out. When the rollers are displaced in opposite directions along their axes, a camber adjustment is indicated, and the servomechanism will cause the displacement box to tip in camber until the rollers' axes are parallel to the tire's axis of rotation and perpendicular to the camber plane, creating an angle that measures camber. At the point where there is no further displacement of the rollers, a null, or steady state is reached, and the toe and camber angles may be read. The camber servomechanism's null state is crucial to dynamic alignment for, without it, unbalanced camber forces would cause a misreading of the toe angle.

It is possible to construct a type of dynamic aligner which does not yield the "full" dynamic alignment function as described above, that is, the full dynamic alignment which includes the turning and tipping of the aligner in both the toe and camber planes. Specifically, another type of dynamic aligner could be constructed which turns only in the toe plane. In this other type of dynamic aligner, an approximation of the tire force condition could be achieved by gimbaling (and measuring) only the toe plane while fixing the camber plane to the nominal camber value of the vehicle to be tested. The approximation achieved could be read as a dynamic toe inclination and could be used to derive an approximation of the dynamic toe angle. It should be understood that, while the following discussion of the system and method of kinetic alignment describes a full dynamic aligner coponent, the system and method is readily adaptable to any other type of dynamic aligner, and that the workings of other types of dynamic aligners are included within the description of a full dynamic aligner.

Each of the aligner types, geometric and dynamic, is well known. There are at least four vendors currently offering geometric type aligners, including Hoffmann (part of the Wegmann Group, 3700 Cohen Pl., P.O. Box 10369, Lynchburg, Va.) and Hunter (Hunter Engineering Co., 11250 Hunter Drive, Bridgeton, Mo.). It is believed that MERILab, Inc., the assignee of the present invention, is the only vendor currently offering a dynamic aligner. Among the published descriptions of dynamic and geometric alignment devices are those contained in U.S. Pat. No. 3,187,440 of Merrill, et al., assigned to Merrill Engineering Laboratories, Inc., the predecessor of the assignee of the current invention (describing a dynamic aligner); U.S. Pat. No. 4,380,875 of Erickson, et al., assigned to the predecessor of the assignee of the current invention (containing additional description of a dynamic aligner); and U.S. Pat. No. 4,856,199 of Merrill, et al., assigned to the predecessor of the assignee of the current invention (describing a geometric aligner, modified to have a single contact point).

It is commonly believed that geometric and dynamic aligners each have certain distinct advantages and disadvantages.

A geometric aligner's perceived advantages follow from its ability to measure the plane of rotation of the wheel from the sidewall of the tire and, hence, to compare the toe and camber angles derived from the measured plane of rotation against the manufacturer's specification. Vehicle manufacturers typically write their specifications geometrically, specifying the toe and camber angles the plane of rotation of the wheel should describe relative to the respective reference lines. When a vehicle manufacturer desires to audit its own assembly line performance in comparison to its specifications for wheel position, the geometric aligner is considered to provide a useful, objective way of measuring quality control.

Two commonly perceived disadvantages of geometric aligners also follow from its sidewall orientation. In the first place, because the sidewall of a tire is uneven, accurate measurement of wheel position from the side of the tire typically requires at least one complete revolution of the tire during which revolution several data points are sampled; for more complete accuracy, the data points are typically averaged, sometimes using statistical algorithms to determine whether a sufficient number of data points have been obtained. During a wheel alignment operation, the geometric aligner is slower than the operator—remembering that the geometric alignment takes some discrete time for wheel revolution and some discrete time for data sampling and analysis, the actual sequential operation can bog down. The operator will typically take an initial measurement of wheel alignment, then make an incremental adjustment to wheel position, then take a second measurement, then make another incremental adjustment, and so on until the resulting measurement is within the proper range. After every incremental adjustment, the operator must wait for the geometric aligner to catch up.

Although there are indications that geometric aligners can, in fact, be expected to function in the near future much more rapidly than they have functioned in the past, it has typically been the case that geometric alignment has been perceived to to too slow for complete assembly line audit. Instead, it has not been unusual for an assembly line to sample only a few vehicles per shift for geometric alignment checking.

In the second place, some persons have contended that geometric alignment tends to be overly theoretical insofar as it is designed to measure tolerance to design specifications rather than to measure wheel alignment with respect to expected road handling considerations. Such persons tended to suggest that dynamic aligners were more likely to produce a properly handling vehicle.

The perceived advantages and disadvantages of dynamic aligners are, in a sense, the converses of the geometric aligners. A dynamic aligner's perceived advantage follows from its ability to measure displacement from the tread of a rotating tire. As the tire rotates over a pair of rollers, the rollers themselves are displaced on their axes within a displacement box. A servomechanism causes the displacement box to turn about a toe axis and to tip about a camber axis until the box comes into line with the tire forces and the displacement of the rollers reaches a null state for both toe and camber. The ability of the servomechanism to tip the displacement box until a null state for camber is reached preserves the integrity of the resulting toe measurement by eliminating what would otherwise be an unbalanced camber force vector affecting the toe forces. The displacement of the rollers is the starting point for the servomechanism's turning or tipping the displacement box which, in turn, permits the derivation of toe and camber angles. The action of the tire tread on the dynamic rollers approximates the action of the tire tread on the road. When a manufacturer desires to adjust toe and camber to produce an alignment that the customer will perceive to be correct, the dynamic aligner is considered to provide a useful way of increasing customer satisfaction.

Further, because the dynamic aligner works on displacement at the point of tread contact, it can produce accurate readings very rapidly. Typically, a dynamic aligner must initially be calibrated to compensate for tire "run out" during one or more complete revolutions of the tire. But, from that point on, a dynamic aligner can produce its readings from a small arc of rotation. As a result, during a wheel alignment operation, the dynamic aligner is perceived to respond to the operator's adjustments as rapidly as they are made. A typical dynamic aligner has been much more rapid than a typical geometric aligner, and real time dynamic alignment has been possible on an assembly line basis with every vehicle on the line being tested and aligned.

The commonly perceived disadvantage of dynamic aligners also follows from the dynamic aligner's tire force orientation. It is contended that dynamic wheel alignment measurement is not intended to be, and is not, an objective measure of the vehicle's wheel position relative to manufacturer's specifications. So, it is contended, the dynamic wheel alignment measurements do not permit a vehicle manufacturer to learn anything about the quality control of its vehicle assembly operations.

It is not the intent of this discussion of the background of the invention to do more than outline the contours of some of the major difficulties facing vehicle manufacturers and those who have attempted to produce effective wheel alignment devices. For now, the important point is simply the existence of two distinct kinds of measuring devices, each of which has been commonly perceived to have its own unique advantages. To be properly aligned, a vehicle's toe and camber must be set to be within the vehicle manufacturer's specifications, but the vehicle must also drive properly.

Because geometric alignment is taken from the sidewall of the tire and is designed to calculate the plane of rotation of the wheel itself, geometric alignment is generally believed to set the alignment more nearly in accordance with the vehicle manufacturer's specifications for wheel position. Because dynamic alignment is taken from the rolling tread of the tire and is designed to calculate the displacement of the tire as it tracks on the ground, dynamic alignment is believed to set the alignment more nearly in accordance with the vehicle driver's expectations for driveability.

If the two devices produced identical readings, and were otherwise equal, it would seem likely that one would have supplanted the other. This has not happened. The devices produce different readings (a vehicle wheel's toe angle measured on a geometric aligner can, and frequently does, differ from the same vehicle wheel's toe angle measured a dynamic aligner). It is believed that the two devices produce different readings because a dynamic aligner is sensitive to tire forces to which a geometric aligner is not responsive.

Tire forces, including conicity and ply steer, are evident where the tread of the tire hits the road and can apply lateral force to pull a wheel sideways. Properly constructed tires should have tire forces within tire specifications so that there is no, or minimal, tire force effect on the driveability of a vehicle. Accordingly, where the tires are perfectly constructed, there should be no difference between geometric and dynamic measurements of the wheel alignment of a vehicle, but where tires are not so constructed there will be a difference between the readings equal to the amount of unbalanced tire force.

It is possible, because of tire forces attributable to tires out of specification, for a vehicle wheel to be perfectly aligned in accordance with geometric toe and camber, and yet, at the same time, drive as if out of alignment. It is in such conditions that geometric and dynamic measurements of wheel alignment will differ, with one measuring the specifications of the wheel and the other measuring the driveability of the wheel.

It is a specific object of the present invention to create an alignment system which combines the best elements of geometric aligners and dynamic aligners to create results unobtainable from either device alone. Specific advantages of this invention are speed, flexibility, self-audit and tire audit, all being done at a production line through-put rate that is relatively high compared to present alignment systems and at no added labor cost. In particular, the kinetic system and method of this invention: obtain the level of speed previously associated with dynamic alignment; permit geometric and dynamic measurements to be taken nearly simultaneously and enable an operator to make alignment adjustments using either measure as base; record both geometric and dynamic data for self-audit purposes; and, perhaps most importantly, permit a tire audit to be done on the same production line cycle with no additional time being required to check the tires.

It is another object of the present invention to create an improved geometric aligner to be used as part of the kinetic alignment system of this invention, or otherwise. The improved geometric aligner of this invention has (a) an improved pivot assembly so as better to keep the rollers of a geometric aligner in contact with the tire sidewall as the tire's position changes, and (b) an improved striker assembly so as better to strike the sidewall of the tire at the tire's center line and, where the exact center line is missed, to self-correct for the unbalanced forces resulting from the missed strike. The improved geometric aligner contributes to the overall advantages of the kinetic alignment system of this invention.

SUMMARY OF THE INVENTION

This invention pertains to a vehicle wheel alignment system and method. More particularly, the kinetic alignment system of this invention combines a geometric wheel aligner and a dynamic wheel aligner into an integrated kinetic system that simultaneously and rapidly measures both the position of a vehicle's wheel and the roll of the tire associated with the wheel. Further, the geometric aligner of this invention includes an improved pivot assembly to project the kingpin axis during wheel alignment, and an improved striker assembly to strike the sidewall of the tire at the center line and to self-correct for mispositioned strikes. Finally, the method of this invention is a way of using the new kinetic alignment system to perform a real time, single pass, production line audit of: (a) the vehicle manufacturer's attainment of wheel position specifications, (b) the vehicle's actual road tracking, and (c) the tire vendor's attainment of tire tracking specifications. All of the audits are done with no added time, equipment or labor costs while the vehicle's wheel alignment is rapidly adjusted by the system and method of this invention.

The new kinetic alignment system, the improved geometric aligner, and the method of using them create new and valuable audit information for vehicle manufacturers, provide flexibility to the manufacturers by permitting them to measure and adjust wheel alignment on whichever basis the manufacture selects, and solve the production line problem by speeding up the alignment operation so that vehicle wheel alignment can be performed on all the vehicles coming down the line (rather than being performed on only a relatively small sampling of vehicles as is typically the case with existing aligners).

Most importantly, the present invention isolates and identifies the previously unquantified contribution of tire forces to overall vehicle wheel misalignment. The system and method of the present invention is able to break the misalignment problem down into two factors: that factor related to wheel position misalignment (generally a geometric proposition and a factor within the control of the automobile manufacturer), and that factor related to wheel pull caused by tire forces (generally a dynamic proposition and a factor outside the direct control of the automobile manufacturer). By doing so, each factor can be identified.

Only by combining the radically different geometric and dynamic aligning technologies is it possible to achieve the unexpected improvements of this invention.

DETAILED DESCRIPTION OF THE PREFERRED EMBODIMENT

It should be understood that geometric aligners and dynamic aligners, including the microprocessors and other electronic circuits necessary to realize the logic and memory functions related to position sampling, and the various output devices suitable for showing the derived output, are well known. The manner of making and using such device is likewise well known, and U.S. Pat. Nos. 3,187,440 of Merrill, et al., 4,380,875 of Erickson, et al., and 4,856,199 of Merrill, et al., are hereby incorporated by reference.

The following discussion is intended to explain how these known devices are combined into the kinetic alignment system of this invention. In the following discussion, the kinetic alignment system will first be discussed, then the improved pivot and the improved striker assembly of the geometric aligner will be discussed, and then the method of using the kinetic alignment system will be discussed. Details of the geometric aligners and dynamic aligners are included only to the extent that they aid in the understanding of the present invention.

The kinetic alignment system

Figure 1:
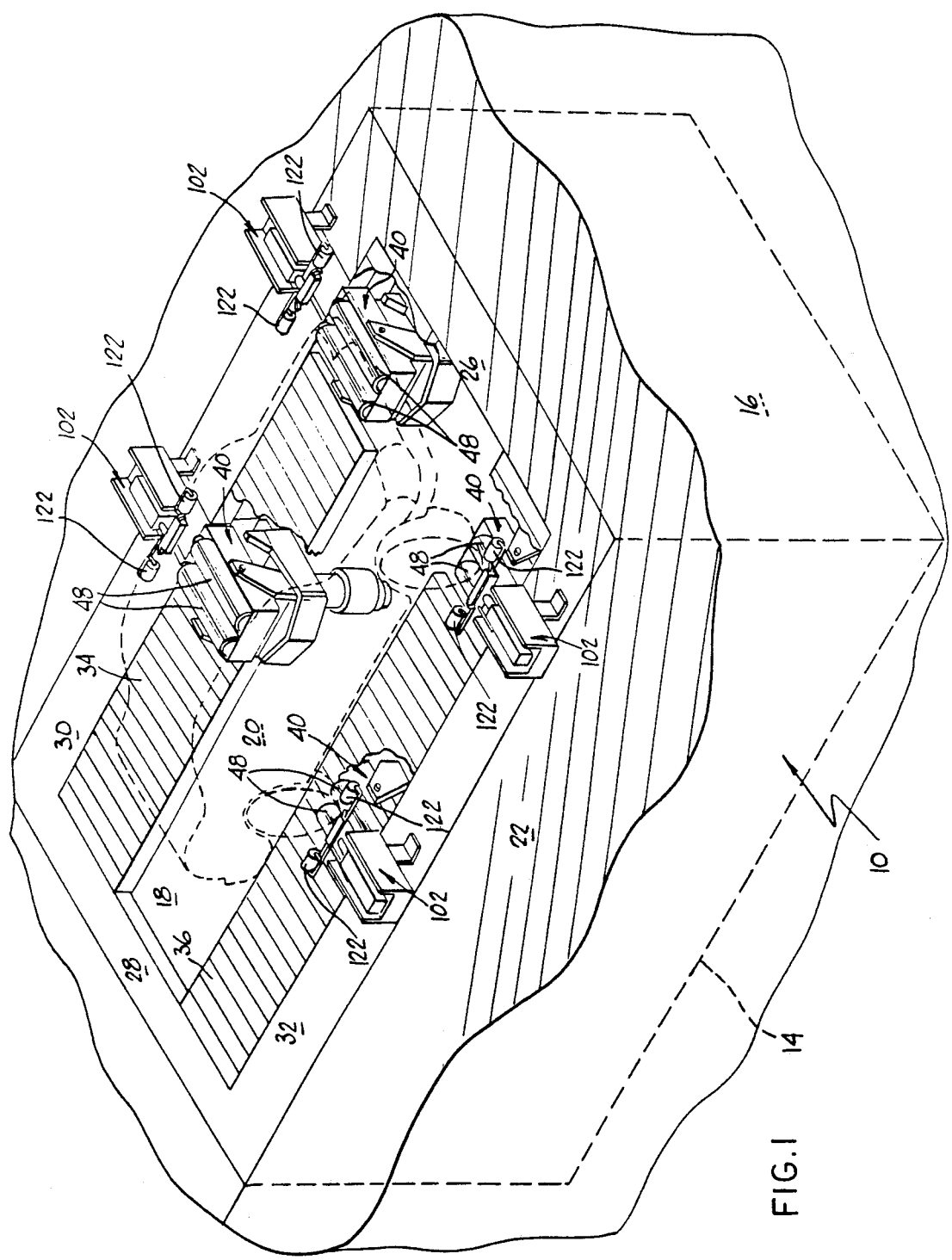
FIG. 1 is a orthographic view of the kinetic alignment system.

The kinetic alignment system of this invention can best be seen in overview with reference to FIG. 1. It consists of an aligning pit 10, four dynamic aligners 40, and four geometric aligners 102. In the next paragraphs, it will be explained that the aligning pit 10 has an interior frame, not separately numbered, and an exterior casing, not separately numbered. The dynamic aligners 40 are fixedly mounted to the interior frame of the aligning pit 10 and the geometric aligners 102 are fixedly mounted to the exterior casing of the aligning pit so that when a wheeled vehicle is properly positioned on the kinetic aligner, each wheel of the vehicle is directly on top of a dynamic aligner and directly adjacent to a geometric aligner.

The aligning pit 10 has an interior frame, not separately numbered, including a floor 14, front wall 16, back wall 18, left side wall 20 and right side wall 22. About its upper periphery, the aligning pit 10 has an exterior casing, not separately numbered, which includes a front lip 26, back lip 28, left side lip 30 and right side lip 32. The walls of the interior frame of the aligning pit 10 are designed to have a width of at least 16 inches at their top surface so that the top surface of each wall also functions as the exterior casing of the aligning pit 10. That is, the top surface of the front wall 16 of the interior frame is the front lip 26 of the exterior casing. In similar manner, the top surfaces of the back wall 18, left side wall 20 and right side wall 22 of the interior frame of the aligning pit 10 are the back lip 28, left side lip 30 and right side lip 32 of the exterior casing of the aligning pit 10.

Four dynamic aligners 40 are attached to the walls of the interior frame of the aligning pit 10, with two dynamic aligners attached to the left side wall 20 and two dynamic aligners attached to the right side wall 22. As illustrated in FIG. 1, the dynamic aligners are attached so that the rollers 48 at the top of the dynamic aligners are flush with the exterior casing of the aligning pit 10. The dynamic aligners 40 are appropriately spaced so as to support on their rollers 48 the wheels of a vehicle.

Running lengthwise from front to back on either side of the aligning pit 10 are two tracks, a left track 34 and a right track 36. The tracks are mounted flush with the front lip 26 and back lip 28 of the exterior casing of the aligning pit 10. Each track has a cut out for the two dynamic aligners 40 attached to each side wall of the aligning pit 10. In the preferred embodiment, the aligning pit 10 is sunk below ground with its exterior casing at ground level so that when a wheeled vehicle is driven onto the tracks and positioned with each wheel centered on a dynamic aligner 40, the vehicle will be supported at ground level.

Four geometric aligners 102 are attached to the lips of the exterior casing of the aligning pit 10, with two geometric aligners attached to the left side lip 30 and two geometric aligners attached to the right side lip 32. As illustrated in FIG. 1, the geometric aligners are attached so that each geometric aligner 102 is centered adjacent to a corresponding dynamic aligner 40, forming four paired sets of dynamic and geometric aligners, one pair for each of the four wheels of a vehicle. As will be explained in more detail later, the rollers 122 at the ends of the rocker bars 120 of the geometric aligners 102 are moveably oriented with respect to the tires of a vehicle positioned on the apparatus of this invention so that the rollers 122 of each geometric aligner 102 can be made to contact the sidewall of a tire, while the tread of the tire is, simultaneously, in contact with the rollers 48 of the corresponding dynamic aligner 40. Thus, when a wheeled vehicle is properly positioned on the kinetic alignment system, each wheel is directly on top of a dynamic aligner 40 and is directly beside a geometric aligner 102.

The aligners will be discussed in more detail later, but it has already been seen that the four dynamic aligners 40 are fixedly mounted to, and supported by, the interior frame of the aligning pit 10, and the four geometric aligners 102 are fixedly mounted to, and supported by, the exterior casing of the aligning pit. The dynamic aligners 40 are set so that the two left dynamic aligners are in cut outs on the left track 34 and the two right dynamic aligners are in cut outs on the right track 36. The geometric aligners 102 are set so that one geometric aligner is adjacent to each dynamic aligner, forming four paired sets of dynamic and geometric aligners, one pair for each of the four wheels of a vehicle.

Figure 2:
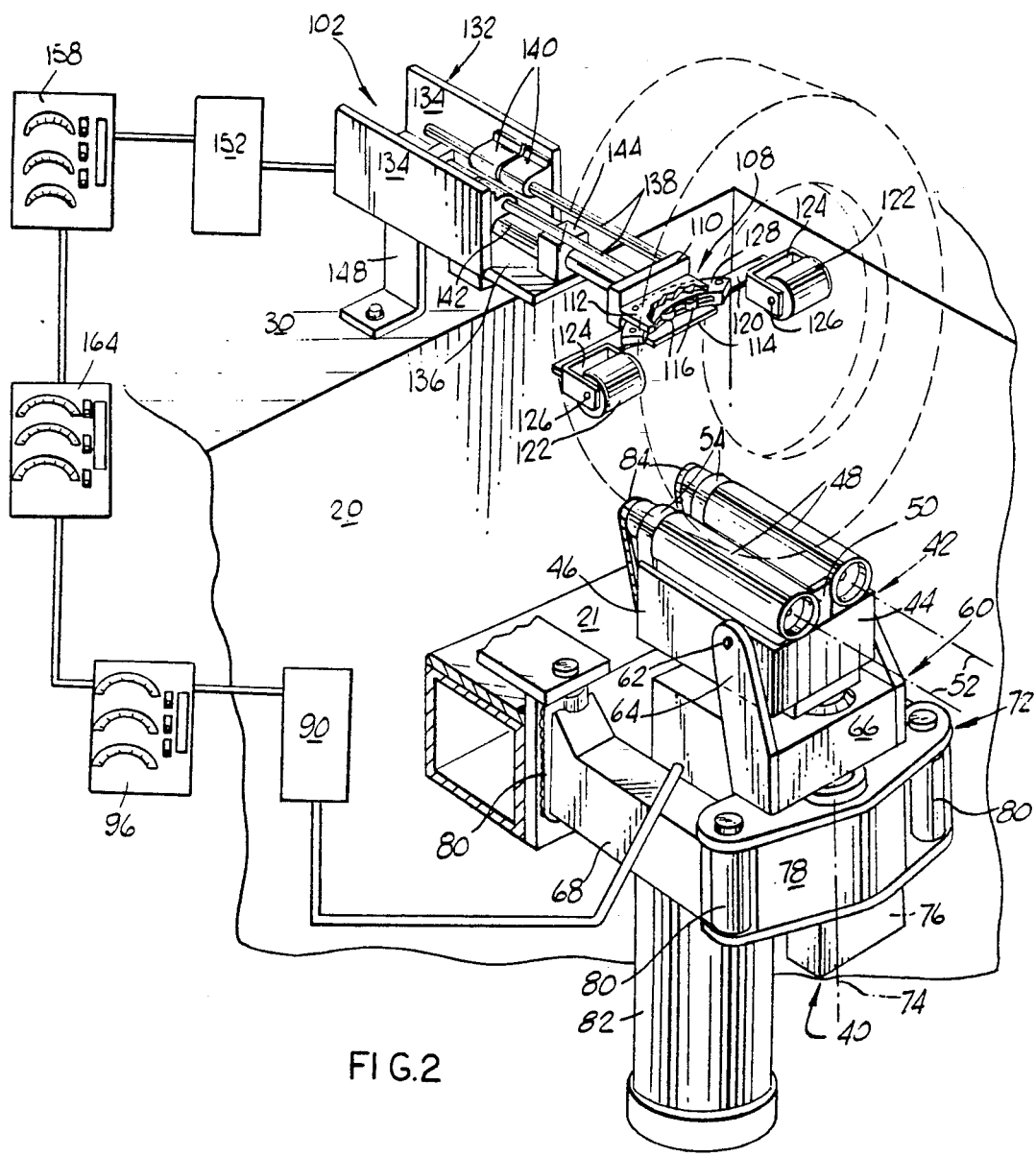
FIG. 2 is a partially projected schematic view, combined with a pictorial view, of the left front paired geometric aligner and dynamic aligner.

The dynamic aligners 40 and geometric aligners 102 are shown in more detail in FIG. 2, which shows a pair of aligners at the left front of the aligning pit 10. The dynamic aligner 40 and geometric aligner 102 of this pair will be discussed in turn below, and it should be understood that the other three pairs are essentially the same as this pair.

The dynamic aligner 40 includes a displacement box assembly 42, a camber pivot assembly 60, a toe pivot assembly 72, a motor assembly (not separately numbered), a servo/sensor and sampling assembly 90 and a dynamic alignment output assembly 96.

The displacement box assembly 42 of the dynamic aligner 40 includes two side plates 44 connected to two front/back plates 46 to form a box having openings on the top and bottom. Within said box are two rollers 48 separated from one another by two front/back spacer bars 50 mounted on the side plates 44. Each of the two rollers 48 is rollably mounted on a roller axis 52, and each roller axis 52 is suspended from a roller axis bracket 54 which brackets are mounted on the side plates 44. The rollers 48 thus are mounted parallel to the front/back plates 46 of the displacement box assembly 42 of the dynamic aligner 40.

The camber pivot assembly 60 of the dynamic aligner 40 includes a camber pivot axis 62 which runs lengthwise through the displacement box assembly 42 between the two front/back plates 46 of the displacement box and beneath the rollers 48 thereof. The camber pivot axis 62 of the camber pivot assembly 60 is housed in a camber pivot yoke 64 which is rigidly attached, at the other end thereof, to a movable base 66. It can be seen that the displacement box 42, previously described, can pivot about the camber pivot axis 62 of the camber pivot assembly 60.

The toe pivot assembly 72 of the dynamic aligner 40 includes a main frame 78. The main frame 78 is pivotally fixed to a support member 21 mounted in the left side wall 20 of the interior frame of the aligning pit 10 by two support legs 68. Each support leg 68 is pivotally attached by a vertical roller bearing 80, at one end thereof, to the main frame 78 and is attached by a vertical roller bearing 80, at the other end thereof, to the support member 21. It can be understood that the main frame 78 can swing on its support legs 68 to accommodate a wheeled vehicle driven on to the dynamic aligner 40, and that the entire dynamic aligner is securely linked to the aligning pit 10 by the support legs 68 that connect the main frame 78 of the toe pivot assembly 72 to the aligning pit.

A toe axis housing 76 is attached to the bottom surface of the main frame 78. A toe pivot axis 74 runs through the main frame from the toe axis housing 76 to the movable base 66 of the camber pivot assembly 60 and passes through said movable base. It can be seen that the movable base 66 of the camber pivot assembly 60 can rotate about the toe pivot axis 74 of the toe pivot assembly 72.

The motor assembly (not separately numbered) of the dynamic aligner 40 includes an engine 82 and two drive chains 84. The engine 82 is mounted beneath the main frame 78 of the toe pivot assembly, and the two drive chains 84 link the engine to each of the rollers 48 within the displacement box 42 and drive the rollers 48. The dynamic aligner 40 also includes a servo/sensor and sampling assembly 90 which has (a) a servomechanism (not shown) which can cause the displacement box to turn about the toe pivot axis 74 when the two rollers 48 are displaced in the same direction along their axes 52, and which can cause the displacement box to tip about the camber axis 62 when the two rollers are displaced in opposite directions along their axes 52; and (b) sensing devices (not shown) that measure the location of the displacement box as it pivots about the camber pivot axis 62 and the toe pivot axis 74. Finally, the dynamic aligner 40 includes a dynamic alignment output assembly 96 which has output devices that show the camber angle and toe angle derived from the measured locations.

In isolation, the dynamic aligner 40 would operate in the typical way. A vehicle is positioned so that its wheels are centered over the rollers 48 of the dynamic aligner and the vehicle is suitably secured by stops (not shown). The engine 82 and drive chains 84 of the motor assembly of the dynamic aligner 40 causes the rollers 48 to spin. As the vehicle wheel rotates over the rollers 48, the rollers are displaced. The movement of the rollers 48 is transferred to the displacement box assembly 42. Angles formed by the movement of the displacement box about the camber pivot axis 62 of the camber pivot assembly 60 and about the toe pivot axis 74 of the toe pivot assembly 72 are measured by the servo/sensor and sampling assembly 90. The angles are output to an operator in readable form by the dynamic alignment output assembly 96. An operator would then make such adjustments to the tie rod and vehicle frame as needed to bring the toe angle and camber angle into the desired range.

Having completed the description of the dynamic aligner 40 of the kinetic alignment system of this invention, the geometric aligner 102 will next be described.

The geometric aligner 102 includes a pivot assembly (not separately numbered), a displacement rocker assembly (not separately numbered), a base assembly (not separately numbered), a sensor and sampling assembly 152, and a geometric alignment output assembly 158.

The pivot assembly of the geometric aligner 102 includes a pivot housing 108 and vertical roller bearings 116. The pivot housing 108 consists of a back plate 110 to which are affixed a top plate 112 and a bottom plate 114 so as to form a housing having openings at the sides and at the front. There are four vertical roller bearings 116 (only two of which are visible in FIG. 2) which are vertically disposed from the top plate 112 to the bottom plate 114 of the pivot housing 108.

The displacement rocker assembly of the geometric aligner 102 includes a rocker bar 120 having a roller 122 at each end thereof. The rollers 122 are rollably mounted on roller axes 126 that are housed in roller brackets 124 attached to the rocker bar 120 so that the roller axes 126 are parallel to the rocker bar 120. There is a curved adapter bar 128 which is bolted, at each end of the adapter bar, to the top of the rocker bar 120 at about the center of the rocker bar. The curved adapter bar 128 is spaced sufficiently above the top surface of the rocker bar 120 so that the curved adapter bar 128 can be housed within the pivot housing 108 of the pivot assembly of the geometric aligner 102 while the rocker bar 120 is outside and beneath the pivot housing 108. When the curved adapter bar 128 is housed within the pivot housing 108, the rocker bar 120 is suspended from the curved adapter bar 128 and is located beneath the bottom plate 114 of the pivot housing 108.

The base assembly of the geometric aligner 102 includes a push rod housing 132, push rods 138 and 142, and mounting bars 148. The push rod housing 132 consists of two front/back plates 134 affixed to a bottom plate 136 so as to form a housing having openings at the sides and on top. Two lateral push rods 138 are housed within lateral journal housings 140, which lateral journal housings are affixed to the inner surface of the front/back plates 134 of the push rod housing 132. A center push rod 142 is housed within a center journal housing 144, which center journal housing is affixed to the top surface of the bottom plate 136 of the push rod housing 132. The push rod housing 132 is rigidly connected to two mounting bars 148. The mounting bars 148 are each connected, at one end thereof, to one of the front/back plates 134 of the push rod housing 132 and, at the other end thereof, to the left side lip 30 of the exterior casing of the aligning pit 10. The push rods 138 and 142 of the base assembly of the geometric aligner 102 are rigidly attached to the back plate 110 of the pivot assembly 108 of the geometric aligner so that the push rods can alternately push the pivot assembly towards the tires of a vehicle positioned on top of the dynamic aligner 40 (thereby bringing the rollers 122 of the displacement rocker assembly of the geometric aligner 102 into contact with the side walls of the tire for alignment), or pull the pivot assembly away from the tires of the vehicle (thereby releasing contact and permitting a vehicle to be freely driven on and off of the kinetic alignment system). The hydraulics by which the push rods are moved are well known and are not discussed here.

The geometric aligner 102 also includes a sensor and sampling assembly 152 which has sensing devices (not shown) that measure the location of the displacement rocker assembly as it pivots within the pivot housing 108 of the pivot assembly, and a geometric alignment output assembly 158 which has output devices that show the toe angle derived from the measured locations.

In isolation, the geometric aligner 102 would operate in the typical way. A vehicle is positioned so that its wheels are centered adjacent to the rollers 122 of the geometric aligner and the vehicle is suitably secured by stops (not shown). The push rods 138 and 142 of the geometric aligner 102 are actuated by hydraulics (not shown) so as to push the rollers 122 of the displacement rocker bar assembly of the geometric aligner 102 into contact with the sidewalls of the tires of the vehicle's wheel. An engine would cause the vehicle wheels to rotate. As the vehicle wheel rotates, the tire sidewalls displace the rollers 122 of the geometric aligner 102. The movement of the rollers 122 is transferred to the rocker bar 120. Angles formed by the movement of the rocker bar about the pivot housing 108 of the pivot assembly of the geometric aligner 102 are measured by the sensor and sampling assembly 152. The angles are output to an operator in readable form by the geometric alignment output assembly 158. An operator would then make such adjustments to the tie rod and vehicle frame as needed to bring the toe angle into the desired range.

Having described the dynamic aligner 40 and geometric aligner 102 of the kinetic alignment system of the present invention in isolation, their mutual cooperation can now be readily understood. As can be seen from FIGS. 1 and 2, each dynamic aligner 40 is paired with a geometric aligner 102. Of the aligner pairs, the dynamic aligner 40 has the rollers 48, engine 82 and drive chains 84 that cause a vehicle's wheel to spin; the geometric aligner 102 takes its readings from the tire sidewalls of the spinning wheel at the same time as the dynamic aligner is taking its readings.

The separate readings are displayed at the dynamic alignment output assembly 96 and at the geometric output assembly 158. The readings are displayed, recorded, and combined either manually or, in the preferred embodiment, by using a combination control and display assembly 164. The control and display assembly 164 contains well known microprocessor and electronic circuit devices (not separately shown here), including comparators by which the difference between the geometric measurements and dynamic measurements can be calculated, modulators by which the difference can be added to or subtracted from either measurement, and logic gates connected to operator-actuated switches so that the operator can select which measured signal (the geometric or the dynamic) to modulate, and can select the modulating operation (addition or subtraction). The control and display assembly 164 is made of well known electronic and electro-mechanical devices in a way that would be apparent to anyone familiar with such devices and is not further discussed. The method of using the control and display assembly will be discussed in more detail later in connection with the discussion of the method of this invention.

The combination of dynamic aligners 40 and geometric aligners 102 of this invention is such that the toe angle may be measured by both, but the camber angle is measured by the dynamic aligners 40 alone. Experiments have shown that it is the toe angle which is sensitive to tire forces, and so it is a specific object of this invention to provide for the near simultaneous double measurement of that angle. Because the camber angle has shown no such sensitivity to tire forces, and because both the geometric measurement of camber and the dynamic measurement of camber are substantially the same, there is no need to measure the camber angle twice. Accordingly, the geometric aligner of the preferred embodiment of this invention does not have the third roller which, as has been mentioned previously, is typically added to an isolated geometric aligner in order to measure camber as well as toe. In the kinetic alignment system of this invention, camber is not measured by the geometric aligner.

The Improved Pivot Mechanism and Striker Assembly

This section will discuss the improvements to the geometric aligner component of this invention. The improved pivot mechanism of the geometric aligner of this invention has the effect of projecting a kingpin axis and allowing the rollers to ride more smoothly over the sidewall of the tire as the tire turns. The improved striker assembly provides a simplified means of bringing the rollers into contact with the sidewall of the tire and then self-correcting for any inaccuracy in lining the rollers up with the center line of the tire.

The Pivot Mechanism

The pivot mechanism of the geometric aligner 102 of this invention is an improvement to a geometric aligner. In its preferred embodiment, and as already seen in connection with FIG. 2, the improvement consists of the slidable mounting of the displacement rocker assembly of the geometric aligner 102 within the pivot assembly 108 of the geometric aligner. The improvement can be seen in more detail in FIGS. 3 and 4.

Figure 3:
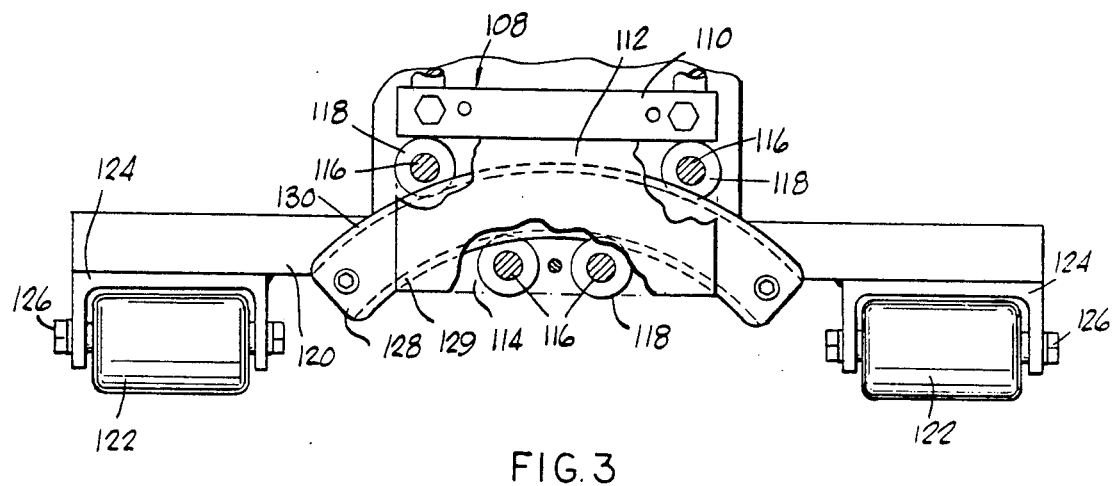
FIG. 3 is a plan view of the improved pivot assembly of the geometric aligner.
Figure 4:
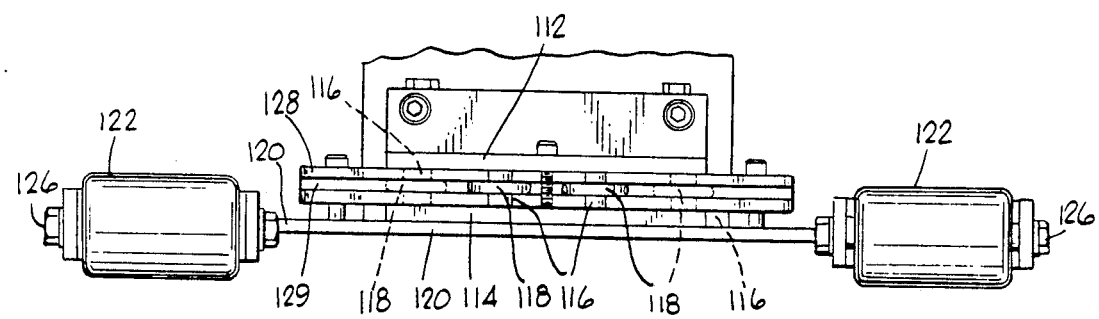
FIG. 4 is a front view of the improved pivot assembly of the geometric aligner.

FIG. 3 is a plan view, and FIG. 4 is a frontal view, showing in more detail the previously described displacement rocker assembly and the pivot assembly of the geometric aligner 102. As has already been described, and can now be seen more clearly, the displacement rocker assembly of the geometric aligner 102 includes a rocker bar 120 having a roller 122 at each end thereof. The rollers 122 are rollably mounted on roller axes 126 that are housed in roller brackets 124 attached to the rocker bar 120 so that the roller axes 126 are parallel to the rocker bar 120. There is a curved adapter bar 128 which is bolted, at each end of the adapter bar, to the top of the rocker bar 120 at about the center of the rocker bar. The curved adapter bar 128 is spaced sufficiently above the top surface of the rocker bar 120 so that the curved adapter bar 128 can be housed within the pivot housing 108 of the pivot assembly of the geometric aligner 102 while the rocker bar 120 is outside and beneath the pivot housing 108. When the curved adapter bar 128 is housed within the pivot housing 108, the rocker bar 120 is suspended from the curved adapter bar 128 and is located beneath the bottom plate 114 of the pivot housing 108.

The pivot assembly of the geometric aligner 102 includes a pivot housing 108 and vertical roller bearings 116. The pivot housing 108 consists of a back plate 110 to which are affixed a top plate 112 and a bottom plate 114 so as to form a housing having openings at the sides and at the front. There are four vertical roller bearings 116 which are vertically disposed from the top plate 112 to the bottom plate 114 of the pivot housing 108.

As can be seen with reference to FIG. 4, the four vertical roller bearings 116 of the the pivot assembly of the geometric aligner 102 each have a center flange 118, and the curved adapter bar 128 of the displacement rocker assembly has a center groove 129 in its front surface. With reference to FIG. 3, it can be understood that the curved adapter bar 128 also has a center groove 130 in its rear surface. The flanges 118 of the roller bearings 116 of the pivot assembly and the grooves 129 and 130 of the curved adapter bar 128 of the displacement rocker assembly work to guide the adapter bar 128 through the pivot housing 108 of the pivot assembly. The adapter bar 128 is guided in a pivoting motion which also has a sliding annular moment imparted to it by the cooperation of the roller bearings 116 with the curvature of the adapter bar 128. As the adapter bar 128 is so guided through the pivot housing, the rocker bar 120 attached to said adapter bar describes an identical range of motion in its plane beneath the bottom plate 114 of said pivot housing. That same range of motion is transmitted to the rollers 122 which are attached to the ends of the rocker bar 120.

Figure 5:
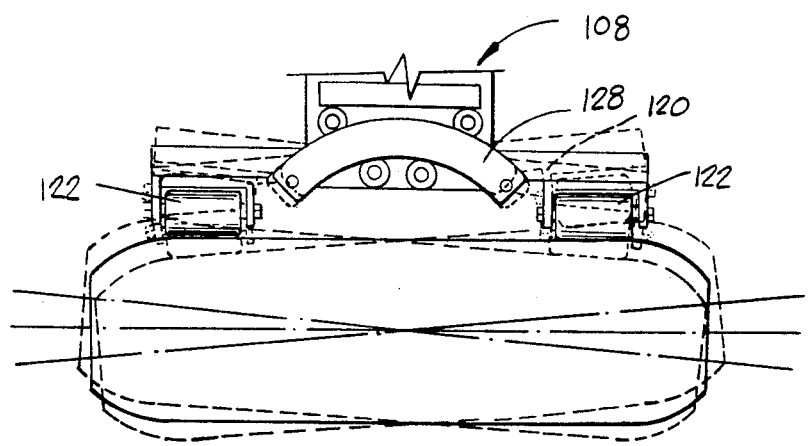
FIG. 5 is a schematic plan view of the improved pivot assembly of the geometric aligner.

From a functional viewpoint, it should be understood therefore that, when the rollers 122 of the geometric aligners 102 are positioned in contact with the sidewall of a tire of a vehicle mounted on the kinetic alignment system of this invention, as shown in FIGS. 1 and 2, the rollers 122 must be free to move so as to maintain contact with the sidewall of a tire in the plane of rotation of the tire. As shown in FIG. 5, when the tire is turned in toe, the rollers 122 maintain contact with the tire, and it is the pivoting of the adapter bar 128 within the pivot assembly 108 that keeps the rollers in contact with the tire. As an operator adjusts the toe angle of the wheel so as to align the wheels of the vehicle, the plane of rotation of the wheel and tire moves, the rocker bar 120 pivots accordingly, and the rollers 122 continue to maintain contact with the tire.

By the cooperation of the curved adapter bar 128 of the displacement rocker assembly and the vertical roller bearings 116 of the pivot assembly, the rollers 122 of the geometric aligner 102 are in constant contact with the sidewall of the tire. In contrast to typical geometric aligners, which pivot a displacement rocker about a single point, the improvement of this invention provides a translation about an arc, maintaining a line tangential to the arc and achieving an effect as if pivoting about an imaginary pivot point located at or near the kingpin axis of the wheel. The improvement provides a truer approximation of the kingpin axis than does the typical geometric aligner because the improved pivot of this invention projects its own turning axis onto, or near, the wheel's axis. This projection of the pivot axis allows wide steer and reduced scrub, eliminating the false position readings that otherwise result from the scuffing of rollers across the sidewall of the tire and the rim of the wheel when the wheel's plane of rotation changes.

The Striker Assembly

The striker assembly of the geometric aligner 102 of this invention is another improvement to a geometric aligner which enhances the overall working of the kinetic alignment system. The striker assembly is the set of parts which positions the rocker bar of the geometric aligner adjacent to the center line of the vehicle tire and then pushes the rocker bar towards the tire until the rollers strike the tire. In order to concentrate on the workings of the kinetic alignment system generally, the striker assembly portion of the geometric aligner has not yet been discussed, and the drawings of FIGS. 1 and 2 have simplified the structure. Now, with reference to FIGS. 6 to 9, the improved striker assembly of this invention will be discussed in detail.

A typical striker assembly for a geometric aligner includes a vertical track, which moves the operative elements of the aligner up and down until the rocker bar aligns with the center line of the tire; a horizontal track, which moves the rocker bar in and out until the rollers of the rocker bar nearly strike the sidewall of the tire; and a set of horizontal hydraulic pushers capable of relatively fine adjustment, to ease the rollers of the rocker bar into contact with the sidewall of the tire.

Figure 6A:
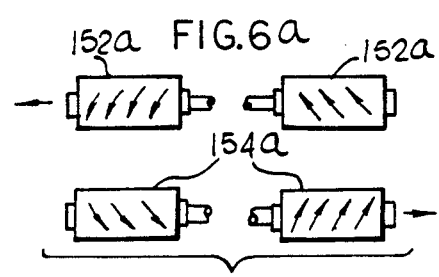
FIG. 6A is a schematic front view of the rollers of a typical geometric aligner, representing the action of the vectors shown in FIG. 6 on the corresponding rollers.
Figure 6:
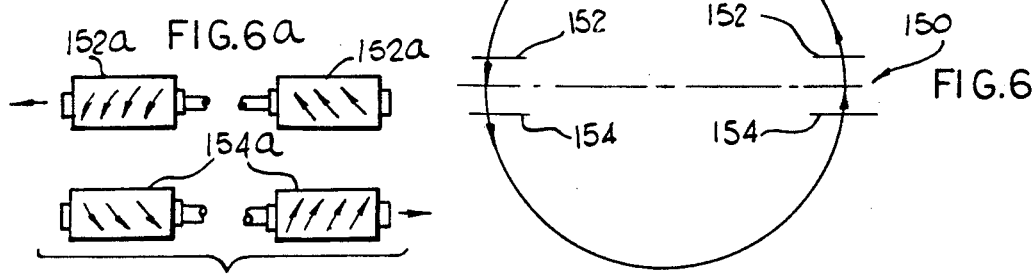
FIG. 6 is a schematic front view of a tire, showing rotational vectors at points above and below the center line of the tire.

With reference to FIG. 6, it can be understood that the exact center line 150 of the tire is the only place on the tire where there will be no vector forces acting upon the rollers of the rocker bar to pull them to one side. If the rollers of the rocker bar were to strike the sidewall of the tire a few inches high, on the line 152 of FIG. 6, the arc vectors are no longer perpendicular to the rollers, but are at an angle which tend to drive the rollers to the left, as illustrated by the rollers 152A in FIG. 6A. In corresponding fashion, should the rollers of the rocker bar strike the side wall of the tire a few inches low, on the line 154 of FIG. 6, the arc vectors would tend to drive the rollers to the right, as illustrated by the rollers 154A in FIG. 6A.

The improved striker assembly of this invention simplifies the movement of the operative elements of the geometric aligner and also self corrects for any imperfect strike (that is, the very common situation where, despite careful movement of the operative elements, the rollers of the rocker bar still fail to strike perfectly along the exact center line, but strike high or low).

Figure 7:
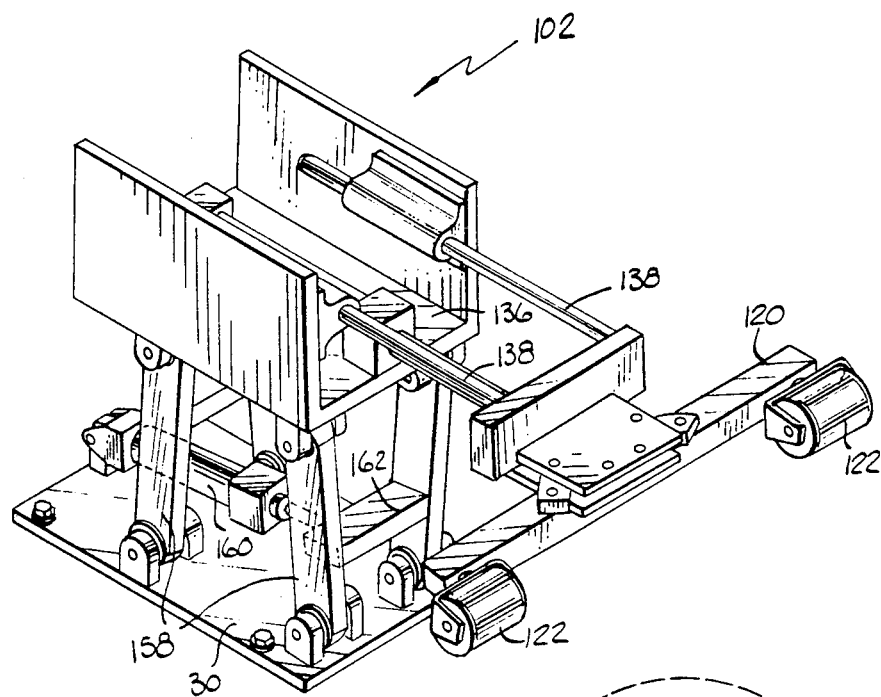
FIG. 7 is a perspective view of the improved striker assembly of the geometric aligner.
Figure 9:
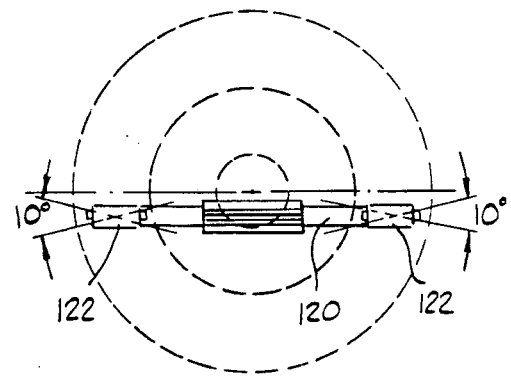
FIG. 9 is a schematic front view of the rollers of the improved geometric aligner, representing their range of motion in response to the rotational vectors.
Figure 8:
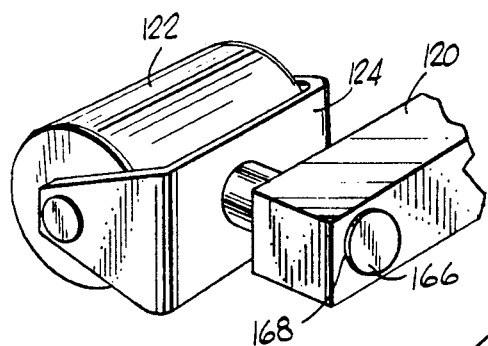
FIG. 8 is a perspective view of a roller of the geometric aligner.

With reference to FIG. 7, it can be seen that the striker assembly includes four pivot legs 158 pivotally attached, at one end thereof to one of the lips 30 of the base of the aligning pit, and at the other end thereof, to the bottom plate 136 of the housing of the geometric aligner 102. A push bar 160 that is pivotally attached, at one end thereof to the lip 30, and at the other end thereof, to a cross bar 162, is actuated (hydraulically or otherwise) to push the pivot legs 158. This action will cause the pivot legs to swing in a controlled arc, and will transmit simultaneous horizontal and vertical movement to the housing of the geometric aligner 102. In practice, the operator will concentrate on the vertical aspect of the movement, so as to bring the rocker bar 120 into line, vertically, with the center line of the tire. When the rocker bar 120 is vertically in line, there will still be a last horizontal movement necessary to bring the rollers of the rocker bar into contact with the sidewall of the tire. This last movement is effected by the push rods 138 which cause the rollers 122 to strike the sidewall of the tire.

The rollers 122 are gimballed so as to self correct for any imperfect strike. As can be better understood with reference to FIG. 8, a rod 166 fixed to the roller brackets 124 of the rollers 122 and rotatably set in a bushing 168 within the rocker bar 120 works to gimbal the rollers 122 so that they may revolve about the axis of the rod 166. As a result, should there be an imperfect strike of the rollers 122 against the sidewall of the tire so that they miss the exact center line, the rollers will revolve, gimballing in response to the arc vectors, and will self correct by shifting to a new position perpendicular to the arc vectors, neutralizing the forces that would otherwise pull the rollers to one side or another. It has been found, in practice, that the rollers 122 can be easily made to strike the sidewall of the tire within a few inches of the center line and that, within this range, a ±5° revolution of the gimballed rollers will suffice to rotate them about to the perpendicular relative to the arc vectors of the tire. As can be understood from the foregoing description and by FIG. 9, it thereby happens that the rollers 122 self correct quickly and automatically to neutralize those forces that would otherwise corrupt the validity of the geometric aligner's measurement of the wheel position.

Finally, it has been observed, if the degree of freedom of the gimballed rollers 122 of the geometric aligners used as part of the overall kinetic system of this invention is too great, the vehicle may be unstable on the platform of the kinetic aligner. By "the degree of freedom of the gimballed rollers 122" is meant the angular moment necessary to bring the rollers 122 into a right angle with the vectors of the rotating tire. Where the rollers 122 are positioned at the exact horizontal center line of the tire, the rollers are already at a right angle and there is no angular moment necessary; but as the rollers strike further away from the horizontal center line, the angular moment increases. In a preferred embodiment of this invention, and as already described, the angular moment is ±5°, a 10° degree of freedom which is able to compensate for a mis-strike of about 5 inches above or below the center line.

In order to reduce the necessary degree of freedom even further, another embodiment of the improved striker assembly includes a servomechanism of conventional type (not separately shown in the drawings, but readily understood with reference to FIG. 7) which is disposed in operative connection with the rollers 122 of the geometric aligner and the push bar 160 of the geometric aligner. Whenever the rollers 122 are not positioned at the exact center line of the tire, there will be a measurable lateral force pulling the rollers to the left or the right (see generally the schematic of the rollers 152a and 154a of FIG. 6A.). In the presence of such a lateral force, the push bar 160 is actuated to raise or lower the operative elements of the geometric aligner. Alternatively, the servo-mechanism can be disposed to sense the angular moment of the rollers 122. Whenever the angular moment is not zero, the push bar 160 is actuated to raise or lower the operative elements of the geometric aligner.

This servo-mechanism is a further means for causing the rollers 122 to strike at about the center line of the tire and is an additional improvement to the typical geometric aligner, which is often simply preset by vehicle make and model, and further enhances the working of the kinetic system of this invention. The elements of the servo-mechanism itself are well known and are not further described here.

The striker assembly of the geometric aligner of this invention further enhances the working of the system. It is believed that the improved striker assembly is an important feature of the kinetic alignment system of this invention because of the kinetic system's increased sensitivity compared to the typical geometric aligner operating independently.

The Method of Kinetic Alignment

The method of kinetic alignment of this invention includes the following steps:

1. positioning a wheeled vehicle on the aligning pit 10 of the kinetic alignment system so that each wheel is supported on a dynamic aligner 40 and is adjacent to a geometric aligner 102;

2. obtaining essentially concurrent initial measurements of the wheel alignment of the vehicle from the dynamic aligners 40 and the geometric aligners 102;

3. calculating the difference between the initial measurements derived from the dynamic aligners 40 and the initial measurements derived from the geometric aligners 102; and 4. adjusting the wheel alignment of the vehicle by successive adjustments to the toe and chamber of the wheel and successive measurement of the resulting toe and camber angles until the toe angle and camber angle are each within the desired range.

The typical geometric aligner is noticeably slower than the existing dynamic aligner. Accordingly, a specific feature of this method is to perform the adjusting step (4 above) with reference to the dynamic aligners 40 exclusively. This is done by using the calculated difference between the initial dynamic and initial geometric measurements as a constant offset to the successive dynamic measurements. To illustrate, if the initial dynamic measurement of the toe angle is +0.20° and the initial geometric measurement of the toe angle is +0.18°, the difference is 0.02°. Using 0.02° as an offset, the dynamic aligner is altered by 0.02° on the operator's display and, when the wheel is being aligned by adjusting its toe angle, successive readings are taken from the dynamic aligner. Assuming that the manufacturer's specification calls for a geometric toe angle of +0.15°, the proper toe angle will be attained when the (unaltered) dynamic toe angle measurement is equal to +0.17° or when the (altered) dynamic toe angle measurement is equal to +0.15°. It is therefore possible to achieve an approximation of a geometrically measured alignment by using an offset-adjusted dynamic aligner and realizing an increase in speed.

Further, and given the evolving technology, it may be surmised that there will come a time when the geometric aligners of the future may become as fast, or faster than, the dynamic aligners. In that case, the adjustment method of this invention is more generally stated to consist in determining whether the dynamic or the geometric aligner is the faster and designating the faster one as the "leading" aligner, and designating the slower one as the "following" aligner. In this more general description, the adjusting step includes offsetting the leading aligner to effect an adjustment according to the following aligner. Alignment is then done by adjustments to the wheel with successive readings taken from the leading aligner.

The foregoing discussion is directed towards the unexpected advantage of the current invention, principally as it relates to speed. More important is another unexpected advantage of the current invention. It has already been mentioned that the readings of the toe angle of a wheel may, and very likely will, differ depending upon whether the angle is determined from a geometric aligner or is determined from a dynamic aligner. Using the same example previously given, it may be that the toe angle of a wheel, measured on a dynamic aligner, is +0.20°, but the toe angle of the same wheel, measured on a geometric aligner is +0.18°. As previously discussed, the 0.02° difference between the two readings may be advantageously used as an offset to increase the speed of the alignment process. In addition, and of further advantage, is the fact of the difference itself.

As has already been discussed, the reason for the difference in readings has to do with the nature of the measurements taken by each of the devices. While a geometric system measures the position of the wheel directly from the sidewalls of the tire, a dynamic system measures the position of the wheel from the roll of the tire. In theory, if the tires were perfect so that they rolled true, both the geometric and dynamic measurements would be the same. Any actually observed difference between the two must be the result of tire forces "pulling" the wheel to one direction. Thus, the 0.02° difference of our example constitutes an actual, real time audit of the tires.

Using the system and method of this invention, it is now possible, for the first time: to audit the vehicle manufacturer's attainment of wheel position specifications (from the initial geometric measurement of the wheel alignment); to audit the vehicle's actual road tracking (from the initial dynamic measurement of the wheel alignment); and to audit the tire manufacturer's attainment of tire specifications (using the difference between the geometric measurement and the dynamic measurement). All of these audits can be accomplished at the same time as the vehicle's wheel alignment is being adjusted very rapidly on either a geometric or a dynamic basis (using the appropriate leading aligner and following aligner set). All of these are unexpected results of the combination of two different, and hostile, wheel alignment measurement technologies so as to produce results different from any that could have been realized by either one alone.

The following examples illustrate the flexibility of the kinetic alignment system and method.

EXAMPLE 1

This example illustrates the speed improvement of the system. Assuming that geometric alignment is slower than dynamic alignment but that a vehicle manufacturer requires geometric alignment to original vehicle specifications, the method of this invention operates as follows:

The kinetic aligner performs by first establishing the initial geometric and initial dynamic toe alignment of the wheel. The difference between the toe angle measured by the geometric aligner and the toe angle measured by the dynamic aligner is calculated. The dynamic output readings are then offset by the difference. Using the offset-adjusted dynamic readings as the reference, the wheel is then aligned to its appropriate geometric specifications. Accordingly, an effective geometric alignment is accomplished at a speed associated with dynamic alignment.

EXAMPLE 2

This example illustrates the flexibility, self-audit, and tire audit improvements of the system. Assuming that quality control and performance are both of equal concern to a vehicle manufacturer, the method of this invention operates as follows:

The kinetic aligner performs by first establishing, and recording (a) the initial geometric toe alignment of the wheel, (b) the initial dynamic toe alignment of the wheel, and (c) the difference between the toe angle measured by the geometric aligner and the toe angle measured by the dynamic aligner. The recorded data is retained, with the measurement (a) being used to audit the quality of the vehicle assembly and the measurement (c) being used to audit the quality of the tires.

The kinetic aligner then performs flexibly. The vehicle's wheels are adjusted in whatever manner the operator desires. The actual alignment can be performed dynamically or geometrically, and, in either case, can be derived from whichever of the two devices happens to be performing faster. If the dynamic aligner is performing faster, and if dynamic alignment is desired, the alignment can be effected directly from the dynamic aligner and without the use of any offset. If the dynamic aligner is performing faster, but geometric alignment is desired, the alignment can be effected according to example 1 above. In all cases, the data may be retained for audit purposes.

The foregoing hypotheticals are both based on the relative speed of the current aligners typically in use now. Should the relative speeds change, the kinetic aligner can still take the best aspects of each. If the geometric aligner is performing faster, and geometric alignment is desired, the alignment can be effected directly from the geometric aligner and without the use of any offset. If the geometric aligner is performing faster, but dynamic alignment is desired, the alignment can be effected according to the converse of example 1 above (that is, the geometric readings can be offset by the difference between the toe angle measured by the geometric aligner and the toe angle measured by the dynamic aligner; using the offset-adjusted geometric readings as the reference, the wheel is then aligned to its appropriate dynamic specifications).

EXAMPLE 3

This example illustrates a further self-audit improvement of the system. A problem in measuring wheel position is to: (a) identify a periodic function of data over time, and (b) average the data values over the period. To illustrate that problem as experienced in dynamic alignment, the displacement of the dynamic rollers 48 will be large at the outset, indicating that the wheels are not lined up. As the servo mechanism pivots the displacement box 42, and the wheels come in line, there will be a small periodic perturbation in the rollers 48. The periodic perturbation is averaged over one period and compensated for so that the average displacement is measured. By using a dynamic aligner 40, the present invention can identify a true dynamic null state, in which there are no lateral forces on the rollers.

As a result, the system of the present invention can first identify a null state and then take data samples for measurement. The significance of this is as follows:

When it is attempted to adjust all four wheels of a vehicle simultaneously, the vehicle will move, creating corrupt data (the corruption occurs because the measurement is not instantaneous, but is the average of a running set of data). While the problem of present aligners is to measure a moving target and then to compensate for the motion (that is, to find a periodic function and then to average the data over the period), the method of the present invention circumvents the problem entirely—the system of the present invention would measure a stable, nonmoving target, and so eliminates the need to compensate for the motion. It is the ability to detect the dynamic null which allows the operator to know when there is stability in the wheel.

Another advantage to the detection of the dynamic null, and then using the null point to begin measurement, has to do with the vehicle suspension. At the null point, the suspension is in an unstressed state, and is as relaxed as possible. Again, the null point is indicated by a dynamic aligner because that aligner will have zeroed out, not only toe forces, but camber forces by turning and pivoting the wheel until there are no more forces acting on it. As a result, there is, at the null point, no added force applied to the vehicle's suspension.

The method, therefore, of this example 3 is simply to be alert to the dynamic null and to use the presence of the null as the indicator that valid measurements may be taken. This method may be used in conjunction with the methods already described above to improve the working of the system of this invention.

It can be seen from the above examples and the other discussion of the kinetic alignment system and method of this invention that the objects sought to be attained by this invention, including speed, flexibility and quality control, are met with no net increase in labor or production line cycle time. In addition, the lost dimension of the wheel alignment equation (tire force effect), which has previously been unrecoverable from either a geometric aligner or a dynamic aligner alone, is now available. Insofar as the measure of success of vehicle wheel alignment is the combination of geometric accuracy and the elimination of customer complaints and warranty claims, the improvement of this invention can be seen to contribute to both in a manner not otherwise possible.

What is claimed is:

1. In a device for measuring the wheel alignment of a vehicle with reference to measurements taken from the side-wall of the tire of the wheel, said device having a rocker bar pivotally attached to a base to permit the rocker bar to pivot when the wheel pivots, said wheel having a pivotable axis of rotation, the improvement which comprises:

projecting means including housing means for housing said rocker bar, and including roller bearings housed within said housing means for moveably bearing said rocker bar, for projecting an arc about a section of a circle, said circle being described by a center point located along said pivotable axis of rotation of the wheel and a diameter running from said center point to said rocker bar, said projecting means cooperating with said rocker bar so that, as the wheel pivots, the rocker bar pivots with said wheel about said projected arc, (a) said housing means includes a top plate, said top plate having a back edge fixed to a back plate; and said housing means includes a bottom plate, said bottom plate having a back edge fixed to said back plate, said housing means forming a container having openings at the front and sides; and (b) said roller bearings are disposed rollably within said housing means from said top plate to said bottom plate thereof, and each of the roller bearings has a flange at about the midpoint thereof.

2. The improvement of claim 1, wherein said rocker bar is not disposed between said roller bearings in said housing; and further including a rocker bar adapter attached to the rocker bar on top of, and at about the center of, the rocker bar; said rocker bar adapter being curved, with the curvature being of an arc dimension suitable for rotational motion of said rocker bar adapter within said housing of the projecting means and between the roller bearings thereof; and said rocker bar adapter is grooved lengthwise at front and back, with the groves being of a dimension suitable for guiding the rocker bar adapter along the flanges of the roller bearings of the projecting means; said rocker bar adapter thereby carrying said rocker bar.

3. A method for kinetically aligning the wheels of a vehicle, comprising the steps of:

(a) positioning a wheeled vehicle on a kinetic alignment system having geometric aligning means for geometrically aligning the wheels of a vehicle by measuring at least the toe angle of the wheels with reference to the sidewall of the tires of the wheels, and having dynamic aligning means for dynamically aligning the wheels of a vehicle by measuring at least the toe angle of the wheels with reference to the tread of the wheels;

(b) measuring the wheel alignment of a vehicle with reference to both the geometric aligning means and the dynamic aligning means, wherein said measuring step includes the obtaining of an initial measurement of the wheel alignment from the geometric aligning means and an initial measurement of the wheel alignment from the dynamic aligning means;

(c) observing which of the geometric aligning means and dynamic aligning means is the more rapid in producing said initial measurement of the wheel alignment, the more rapid being designated the "leading" aligner and the less rapid being designated the "following" aligner;

(d) calculating a number which is the difference between said initial measurements; and (e) adjusting the wheel alignment of the vehicle with reference to successive measurements of the wheel alignment of the vehicle taken exclusively from the leading aligner, said measurements being adjusted by the number calculated in said calculating step (d) so as to cause said measurements from the leading aligner to approximate measurements that would have been obtained from corresponding measurements taken from the following aligner.

4. A method for kinetically aligning the wheels of a vehicle, comprising the steps of:

(a) positioning a wheeled vehicle on a kinetic alignment system having geometric aligning means for geometrically aligning the wheels of a vehicle by measuring at least the toe angle of the wheels with reference to the sidewall of the tires of the wheels, and having dynamic aligning means for dynamically aligning the wheels of a vehicle by measuring at least the toe angle of the wheels with reference to the tread of the wheels;

(b) measuring the wheel alignment of a vehicle with reference to both the geometric aligning means and the dynamic aligning means, wherein said measuring step includes the obtaining of an initial measurement of the wheel alignment from the geometric aligning means and an initial measurement of the wheel alignment from the dynamic aligning means;

(c) recording the initial measurement of the toe angle of the wheel of the vehicle from the geometric aligning means for audit purposes;

(d) recording the initial measurement of the toe angle of the wheel of the vehicle from the dynamic aligning means for audit purposes; and (e) recording the number which is the difference between the initial measurements of the toe angle of the wheel of the vehicle from the geometric aligning means and the dynamic aligning means, said number being used to audit the tire of said wheel.

5. A method for auditing the tires of a vehicle, comprising the steps of:

(a) positioning a wheeled vehicle on a vehicle wheel alignment system having a first aligning means including means for measuring at least the toe angle of the wheels with reference to the sidewall of the tires of the wheels for aligning said wheels, and said wheel alignment system having a second aligning means including means for measuring at least the toe angle of the wheels with reference to the tread of the tires of the wheels for aligning said wheels;

(b) obtaining measurements from each of the first aligning means and the second aligning means; and (c) obtaining a number which is the difference between said measurements, said number being used for auditing the tires.

6. A method for auditing a vehicle wheel alignment system, comprising the steps of:

(a) positioning a wheeled vehicle on a vehicle wheel alignment system having a first aligning means including means for measuring at least the toe angle of the wheels with reference to the sidewall of the tires of the wheels for aligning said wheels, and said wheel alignment system having a second aligning means including means for measuring at least the toe angle of the wheels with reference to the tread of the tires of the wheels for aligning said wheels;

(b) obtaining measurements from each of the first aligning means and the second aligning means; and (c) obtaining a number which is the difference between said measurements, said number being used for auditing the first aligning means and the second aligning means of said vehicle wheel alignment system.

7. A method for aligning the tires of a vehicle, comprising the steps of:

(a) positioning a wheeled vehicle on a vehicle wheel alignment system having a first aligning means including means for measuring at least the toe angle of the wheels with reference to the sidewall of the tires of the wheels for aligning said wheels, and said wheel alignment system having a second aligning means including means for measuring at least the toe angle of the wheels with reference to the tread of the tires of the wheels for aligning said wheels;

(b) obtaining measurements from each of the first aligning means and the second aligning means; and (c) obtaining a number which is the difference between said measurements, said number being used to adjust successive measurements obtained from one of the first and second aligning means so that said adjusted measurements obtained from said aligning means approximate the measurements that would have been obtained from the other of said first and second aligning means.

8. The method of claim 5, 6 or 7, wherein said second aligning means includes means for measuring the camber angle of the wheels with reference to the tread of the tires of the wheels, and wherein said measurements from said first aligning means are not taken until after the measurements taken from both the toe angle measuring means of the second aligning means and from the camber angle measuring means of the second aligning means stabilize about a steady value.

* * * * *